A. M. EHRET.
INSULATING FELT.
APPLICATION FILED APR. 17, 1914.

1,148,447.

Patented July 27, 1915.

WITNESSES:

INVENTOR.
Alvin M. Ehret,
BY
ATTORNEY.

UNITED STATES PATENT OFFICE.

ALVIN M. EHRET, OF PHILADELPHIA, PENNSYLVANIA, ASSIGNOR TO EHRET MAGNESIA MANUFACTURING COMPANY, OF PHILADELPHIA, PENNSYLVANIA, A CORPORATION OF PENNSYLVANIA.

INSULATING-FELT.

1,148,447.     Specification of Letters Patent.     Patented July 27, 1915.

Application filed April 17, 1914. Serial No. 832,561.

*To all whom it may concern:*

Be it known that I, ALVIN M. EHRET, a citizen of the United States, residing at Philadelphia, in the county of Philadelphia and State of Pennsylvania, have invented certain new and useful Improvements in Insulating-Felt, of which the following is a specification.

Broadly stated this invention relates to insulating felt and has more particular relation to laminated insulating felt for use, for instance, in connection with the construction of steel railway cars.

As manufactured at present, laminated insulating felt used for the above purpose, is very heavy, is quite expensive and is unsatisfactory in use for the reason that it is relatively rigid in nature and consequently when used to cover convexed or concaved surfaces, breaks or cracks during the bending and fitting thereof. In addition to this, the vibration of a car, fitted with such felt, serves to loosen and disconnect the various layers of material.

The principal object of the present invention is to overcome the above described disadvantageous features and provide as a new article of manufacture, a laminated insulating felt of light, strong, durable, efficient and comparatively inexpensive construction which is pliable and yielding in nature and which although subjected to vibration will maintain in interlocked position its complemental layers.

Other objects will appear hereinafter.

The invention, generally stated, consists of the improvements hereinafter described and finally claimed.

Figure 1:
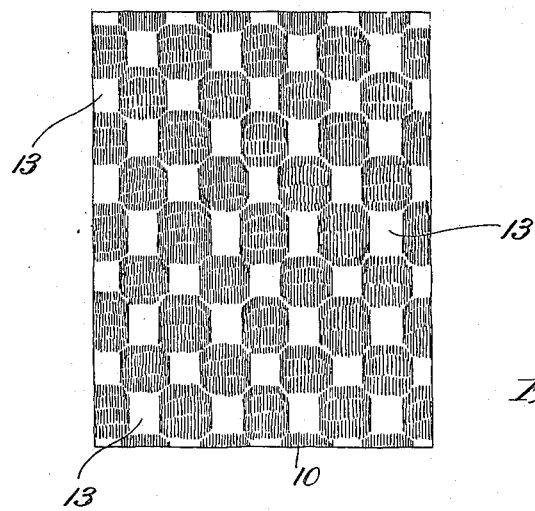
Figure 2:
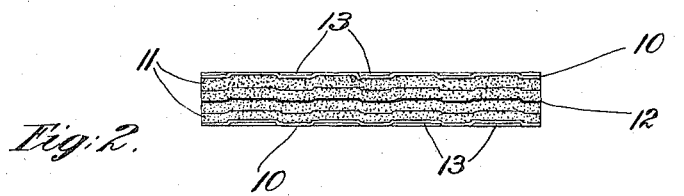
Figure 4:
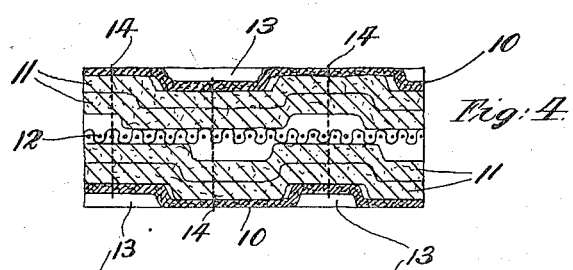
Figure 3:
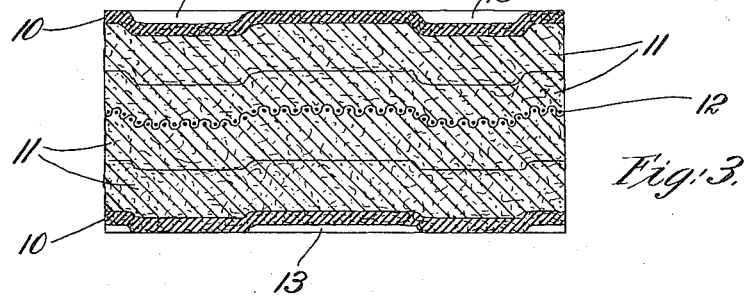

The nature, characteristic features and scope of the invention will be more fully understood from the following description taken in connection with the accompanying drawings forming part hereof and in which:

Figure 1, is a plan view of a piece of laminated insulating felt embodying the invention, Fig. 2, is an edge view thereof, Fig. 3, is a view in cross section, but drawn to an enlarged scale, and Fig. 4, is a sectional view of a modified form of insulating felt.

Referring now to the drawings, and more particularly to Figs. 1, to 3, inclusive, the laminated insulating felt of the invention, briefly stated, is made up of superimposed adhering layers of fire resisting and temperature resisting materials having an adhering textile insert or binder between adjacent, combined layers, the whole structure being indented throughout its length, breadth and thickness. The outer layers are designated 10, and comprise sheets of fire resisting material, for instance, asbestos-felt. Adhering to these layers are inner layers 11, of material possessing heat and cold resisting properties, as for instance, wool-felt. As many wool-felt layers may be employed as desired. Between adjacent layers of wool-felt there is interposed a thin, pliable, textile insert or binder 12, as light weight canvas, cotton, duck or the like. These materials are caused to adhere one with another preferably by the application of a silicate of soda preparation. The adhering materials are passed through suitable apparatus for indenting as 13, the entire structure, considered in length, breadth and thickness. The indentations have staggered relation with one another considered in plan. This indenting process serves to compress the various adhering materials together and relatively interlock them one with another. In this connection, it is to be observed that by reason of this interlocking structure, very little adhesive is required and further serves to prevent disconnecting of the layers when vibration is present in a structure to which the felt is applied. By the above construction of insulating felt, it may be further mentioned that the textile insert or binder provides tensile strength and the multiplicity of staggered indentations provide for great pliability or yielding qualities of the felt as a whole.

Referring now to Fig. 4, a slightly modified form of insulating felt is disclosed. Instead of forming the various layers or plies together with adhesive, the individual strips of material are first indented, then assembled, and then secured together by stitching as 14. In this connection, it may be remarked that the indented portions do not necessarily interlock.

In the fitting of the above described insulating felt to curved surfaces, for instance, in railway passenger cars of the steel type, this pliability or yielding quality serves to permit of the insulating felt readily adapting itself to such surfaces without breaking or cracking. While the above description has been restricted to the use of said insulating material in connection with steel railway equipment, for which it has been particularly designed obviously it may be put to other uses.

What I claim is:

1. As a new article of manufacture an insulating felt embracing superimposed layers of material possessing combustion resisting and heat resisting qualities, a textile binder applied to at least one of said layers said materials all being adhesively held together and the entire structure being profusely indented so as to relatively interlock the various materials one with another by reason of the nesting indented portions.

2. As a new article of manufacture an insulating felt embracing superimposed layers of asbestos-felt and wool-felt, a textile binder as canvas applied to at least one of said layers said materials being adhesively held together and the entire structure being profusely indented so as to relatively interlock the various materials one with another by reason of the nesting indented portions.

3. As a new article of manufacture an insulating felt embracing outer pieces of asbestos-felt, inner pieces of wool-felt and a textile binder, as canvas, interposed between adjacent pieces of said wool-felt all of said parts being adhesively secured together by a silicate of soda preparation and the entire structure being profusely indented to relatively interlock the various materials together.

4. As a new article of manufacture an insulating felt embracing superimposed layers of material possessing combustion resisting and heat resisting qualities at least one of which layers is provided with a textile binder, said materials all being profusely indented so that at least some of the adjacent layers have interlocked relation one with another by reason of the nesting indented portions and independent means for securing the layers together.

5. As a new article of manufacture an insulating felt embracing superimposed layers of material of combustion and heat resisting properties, at least one of said layers being provided with a textile binder as canvas, all of said parts being adhesively secured together by a silicate of soda preparation and the entire structure being profusely indented to relatively interlock all the said materials together by reason of the indented portions nesting.

In testimony whereof, I have hereunto signed my name.

ALVIN M. EHRET.

Witnesses:
BENJ. T. CONNER, Jr.,
WILLIAM J. JACKSON.